Dec. 19, 1922.

G. W. COLLIN.
SELF CLEANING STRAINER FOR FLUIDS.
FILED SEPT. 4, 1920.

INVENTOR
George W. Collin
BY
Chamberlain & Newman
ATTORNEY

Dec. 19, 1922.
G. W. COLLIN.
SELF CLEANING STRAINER FOR FLUIDS.
FILED SEPT. 4, 1920.
1,438,983.
2 SHEETS—SHEET 2.
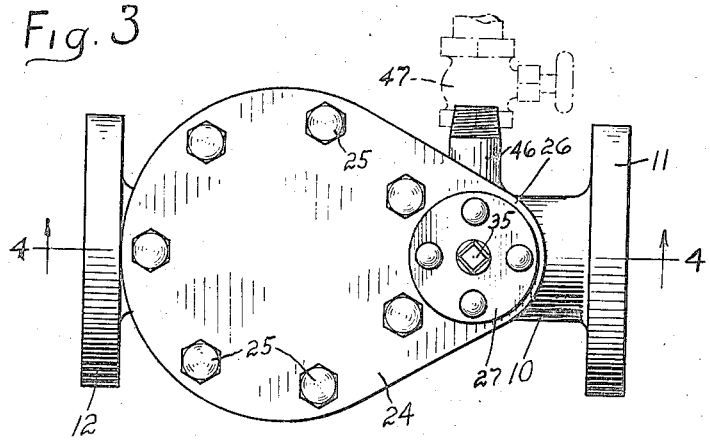
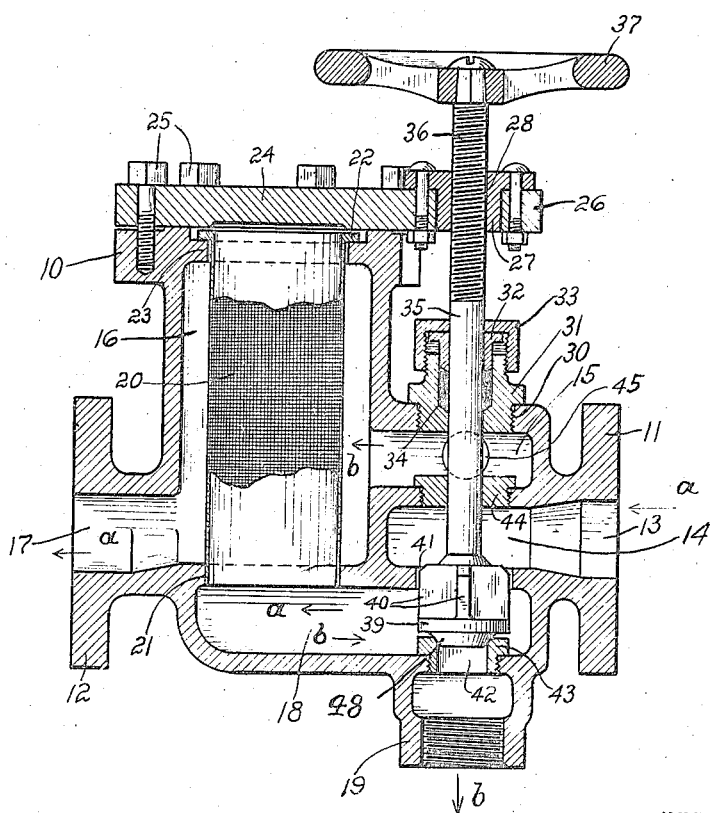
INVENTOR
George W. Collin
BY
Chamberlain & Newman
ATTORNEYS Patented Dec. 19, 1922.

1,438,983

UNITED STATES PATENT OFFICE.

GEORGE W. COLLIN, OF BRIDGEPORT, CONNECTICUT.

SELF-CLEANING STRAINER FOR FLUIDS.

Application filed September 4, 1920. Serial No. 408,137.

*To all whom it may concern:*

Be it known that GEORGE W. COLLIN, a citizen of the United States, and resident of Bridgeport, in the county of Fairfield and State of Connecticut, has invented certain new and useful Improvements in Self-Cleaning Strainers for Fluids, of which the following is a specification.

This invention relates to a self-cleaning strainer for fluids.

The work of cleaning strainers which must be removed from the service system in which they are located in order that they can be freed of arrested matter is laborious and consumes considerable time. Gasket joints must be broken to remove the strainers from the system, the strainer cylinders must be removed from the strainers and cleaned, and the strainers and their cylinders must afterwards be reinstalled in the system. In the re-installing operation difficulty is always experienced in making the gasket joints and valves tight fitting. The object of the present invention is to provide a practical and efficient strainer which is adapted to be installed in a service system and which can be easily, quickly and thoroughly cleaned without the necessity of removing it from the system.

With the above and other objects in view, the invention comprises the construction, arrangement, and combination of parts as now to be fully described and hereinafter specifically claimed.

In the accompanying drawing forming a part of this specification,

Fig. 3 is a top plan view of a slightly modified form of valve casing containing a variant form of strainer; and Fig. 4 is a section on line 4—4 in Fig. 3, looking in the direction of the arrows, and showing the strainer cylinder and the several features of the slightly modified form of valve casing which, together with the strainer cylinder, comprise the variant form of strainer.

Figure 1:
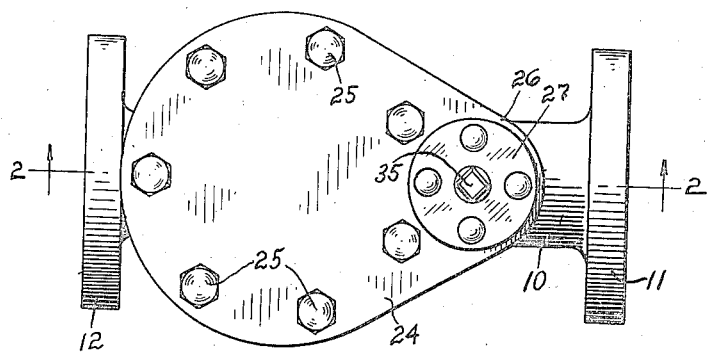
Fig. 1 is a top plan view of a valve casing containing the strainer of the invention.
Figure 2:
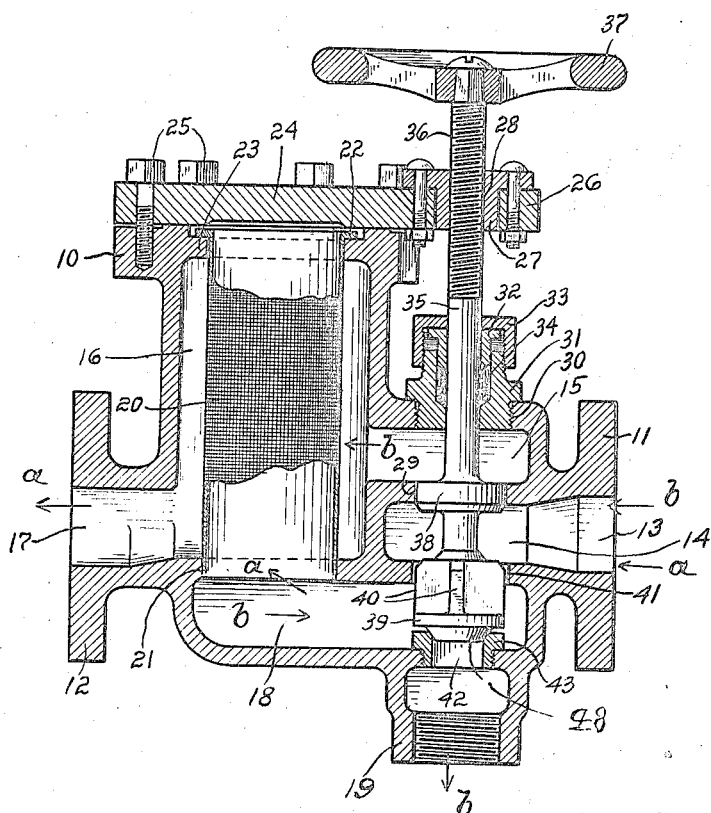
Fig. 2 is a section on line 2—2 in Fig. 1, looking in the direction of the arrows, and showing the strainer cylinder and the several features of the valve casing which, together with the strainer cylinder, comprise the strainer of the invention.

Referring to the form of the invention disclosed in Figs. 1 and 2 of the drawings, 10 denotes a valve casing provided with flange connections 11 and 12, respectively, by means of which the valve casing may be installed in a service system. Flange connection 11 is adapted to be attached to a supply pipe leading from the source of fluid supply and flange connection 12 is adapted to be attached to a supply pipe capable of receiving the fluid after it has been strained. Flange connection 11 is provided with an opening 13 adapted to aline with the supply pipe and with a supply chamber 14 in the valve casing. The valve casing is further provided with a cleaning fluid passage 15 which is preferably located just above the supply chamber, and with a strainer chamber 16 to which the cleaning fluid passage opens and which in turn communicates with an opening 17 in flange connection 12 and in alinement with the supply pipe to receive the strained fluid, and with a supply and blow-out chamber 18 which is itself adapted to have communication with a blow-out connection 19. A strainer cylinder 20, which is adapted to be located in the strainer chamber, has its lower end extending into the opening, denoted by 21, between the strainer chamber and the supply and blow-out chamber. The upper end of the strainer cylinder is provided with a shouldered rim 22 adapted to rest on a circular flange 23 provided in the strainer body at the upper end of the strainer chamber to hold the strainer cylinder in position. 24 denotes a removable body closure plate which is adapted to be attached to the upper portion of the valve casing in any desirable manner, as by means of screws 25, to form a cover for the strainer. As shown, the removable body closure plate is provided with an extension 26 which chambers a hub 27 having an internal thread 28 for a purpose to be explained.

A cleaning fluid port 29 provides communication between the supply chamber and the cleaning fluid passage. The cleaning fluid passage is provided with a threaded opening 30 in alinement with the cleaning fluid port and with hub 27. This threaded opening is adapted to receive a threaded stuffing box 31 having the usual gland 32, gland nut 33 and packing 34 for an obvious purpose.

A valve stem 35, adapted to have a reciprocating fit in the stuffing box hub, is provided with a thread 36 adapted to engage the internal thread in hub 27, and with a hand wheel 37 whereby the valve stem can be made to slide in the stuffing box hub. The valve stem is further provided with three valves, as follows: A plunger valve 38, adapted to have a reciprocating fit in port 29, a guide wing valve 39 having guide wings 40, and a poppet valve 48, the guide wing valve being adapted to close service port 41, leading from the supply chamber to the supply and blow-out chamber, and the poppet valve being adapted to close the blow-out port, denoted by 42, which comprises a valve seat bushing 43 threaded in the body above the blow-out connection.

The modified form of strainer disclosed in Figs. 3 and 4 is identical with the strainer already described, except that in place of the plunger valve, a threaded bushing 44 having a reciprocating fit with the valve stem is provided to close port 29, and that the cleaning fluid passage is provided with an inlet 45 adapted to receive a cleaning material different from the fluid being strained and by means of which the strainer cylinder can be freed of its arrested matter. Examples of cleaning materials that can be used are steam, air, or gas. 46 denotes a connection with the source of cleaning material supply, not shown, and 47 denotes a valve controlling means in said connection.

When the strainer of Figs. 1 and 2 is in service, the several valves are in the positions in which they are shown in the drawings. That is, the plunger valve fills the cleaning fluid port and closes it, the poppet valve has a tight fit with the valve seat in bushing 43, and the guide wing valve is away from the service port so that the fluid to be strained enters opening 13, passes through the supply chamber, through the service port, through the supply and blow-out chamber, through the strainer cylinder, through opening 17 and into the receiving supply pipe, as indicated by the arrows and reference character a in Fig. 2.

When now it is desired to clean the strainer cylinder, all that is necessary is to turn the hand wheel to cause the guide wing valve to be lifted to close the service port. The poppet valve, will, obviously, be thus removed from the valve seat of bushing 43, and the plunger valve, by reason of its reciprocating fit in port 29, will be caused to uncover said port as guide wing valve 39 closes the service port. It will be evident that the fluid will now flow in the direction indicated by the arrows and reference character b in Fig. 2; that is, into opening 13, through the cleaning fluid port, through the cleaning fluid passage, into the strainer chamber, around and through the strainer cylinder, through the supply and blow-out chamber, and into the blow-out connection, the direction of flow of the fluid through the strainer cylinder during the cleaning operation being opposite to the direction of flow when the strainer is in service, so that all arrested matter will necessarily be removed from the strainer cylinder and forced out of the supply and blow-out chamber and into the blow-out connection.

It may here be remarked that the cleaning fluid port 29 cannot be appreciably smaller than the service port 41, for the reason that guide wing valve 39, which is adapted to close the service port 41, must be passed through the cleaning fluid port 29, as well as through the service port, when the valve stem 35 and its integral valves 38 and 39 are installed in the valve casing. As shown in Fig. 2, I preferably make these ports the same size. As the cleaning fluid port 29 does not need to be as large as the service port, it is only necessary to lift the plunger valve 38 a slight distance above port 29 during the cleaning operation. In practice, the top of the plunger valve is lifted to abut the lower surface of the threaded stuffing box. During the time the plunger valve is moving upward from port 29 just after it has caused said port to be slightly opened, the guide wing valve is moving upward in the service port. As it is not essential that the guide wing valve tightly close the service port during the cleaning operation, it is not material that there be an exactness in the stopping point of said guide wing valve as it moves upwardly. It should of course be so arranged that it does not allow the service port to be open beneath it when the plunger valve is abutting the stuffing box hub.

By reversely turning the hand wheel, the valves may be returned to the positions which they occupy when the strainer is in service. The blow-out port requires to be absolutely tight closing when the strainer is in service, and the single poppet valve lends itself to this purpose.

The type of apparatus disclosed in Figs. 1 and 2 is primarily useful for water service systems and water under pressure. It is also applicable for use when steam is the material being strained.

To install the valve stem and its integral valves in the valve casing, the valves are passed through the upper casing opening and the stuffing box hub is placed over the stem and screwed into the upper casing opening.

When the strainer of Figs. 3 and 4 is in service, the valve stem and its two valves are in the position shown in Fig. 4. As has been remarked, the cleaning fluid port is bushed down to the valve stem, enabling the use of the same body as in the case of the form of the invention shown in Figs. 1 and 2. The flow through the strainer of the fluid being strained is exactly the same as before, as shown by the arrows and reference character

*a*. When it is desired to clean the modified form of strainer, the hand wheel is turned to lift the poppet valve from the blow-out port and to cause the guide wing valve to close the service port. The service supply is thus shut off. The cleaning material, for example, steam, is then allowed to enter the steam inlet so that it will successively pass through the cleaning fluid passage, into the strainer chamber, around and through the strainer cylinder in the direction opposite to the direction of flow when the strainer is in service, through the supply and blow-out chamber, and into the blow-out connection. See the arrows and reference character *b* in Fig. 4. At the end of the cleaning operation, the valve controlling means is manipulated to shut off the supply of cleaning material, and the hand wheel is turned in the reverse direction to return the poppet valve and the guide wing valve to the positions which they occupy when the strainer is in service.

The variant form of the invention finds use in connection with any strainable fluid. It has been found to be especially useful for straining oil tar and the like.

While I have shown two ways in which the valve mechanism can be constructed and manipulated to practice the invention, it is to be understood that various changes in details of construction and arrangement of parts can be made without departing from the spirit of the invention and from the scope of the appended claims.

What I desire to claim is:

1. A self cleaning strainer provided with a service port, a cleaning fluid port, and a blow-out port, and further provided with valve mechanism, said valve mechanism consisting of a single valve stem and three valves integrally carried thereby, each of said valves adapted to close one of said ports.

2. A self cleaning strainer provided with a strainer element, and having a service port, a cleaning fluid port and a blow-out port, and further provided with valve mechanism, said valve mechanism consisting of a single valve stem and three valves carried thereby and adapted to be manipulated by said valve stem, two of said valves constructed and arranged, and one of said valves constructed and said blow-out port, respectively, while said service port is open to permit fluid to be strained to pass through said strainer element, and one of said valves connected and arranged to close said service port while said other ports are open, whereby the service flow is cut off and the cleaning fluid port and blow-out port are open to permit fluid to pass around and through the strainer element in opposite directions to clean said strainer element of arrested matter and to force said arrested matter through the blow-out port.

3. A self cleaning strainer comprising a strainer element, means for conducting fluid to be strained through said strainer element, means for conducting cleaning fluid through said strainer element in a direction opposite to that in which said fluid to be strained passes, valve control means for said fluid conducting means, and a single valve stem cooperating with said fluid conducting means and cleaning fluid conducting means adapted to control the direction of flow through said strainer element.

4. A self cleaning strainer provided with a strainer element and having a service port, a cleaning fluid port and a blow-out port, and further provided with valve mechanism, said valve mechanism comprising a single valve stem having three valves all adapted to be manipulated by said stem, said valves including a plunger valve adapted to have a reciprocating fit in said cleaning fluid port, a guide wing valve for said service port, and a poppet valve for said blow-out port, whereby said cleaning fluid port and blow-out port can be closed and said service port can be open to allow fluid to be strained to flow through said strainer element, or said service port can be closed and said cleaning fluid port and blow-out port opened to allow fluid to flow through said strainer element in opposite direction to free the same of arrested matter.

5. A self cleaning strainer provided with a strainer element and having a service port, a cleaning fluid port and a blow-out port, and further provided with valve mechanism, said valve mechanism comprising a single valve stem having three valves all adapted to be manipulated by said stem, said valves including a plunger valve adapted to have a reciprocating fit in said cleaning fluid port, a guide wing valve for said service port, and a poppet valve for said blow-out port, and said plunger valve and guide wing valve so constructed and arranged with respect to each other that said cleaning fluid port opens the instant said service port closes, and closes the instant said service port opens, whereby said cleaning fluid port and blow-out port can be closed and said service port can be open to allow fluid to be strained to flow through said strainer element, or said service port can be closed and said cleaning fluid port and blow-out port opened to allow fluid to flow through said strainer element in opposite directions to free the same of arrested matter.

6. A self cleaning strainer comprising a strainer element, a cleaning fluid passage communicating therewith, a supply chamber in proximity to said cleaning fluid passage and adapted to communicate therewith, a supply and blow-out chamber having communication with said strainer element and adapted to communicate with a blow-out connection, said supply chamber adapted to communicate with said supply and blow-out chamber, and valve mechanism for controlling communication between said supply chamber and said cleaning fluid passage and supply and blow-out chamber, respectively, and between said supply and blow-out chamber and said blow-out connection, said valve mechanism comprising a valve stem and three valves carried thereby and adapted to be manipulated from said valve stem.

7. A self cleaning strainer comprising a strainer element, a cleaning fluid passage communicating therewith, a supply chamber in proximity to said cleaning fluid passage and adapted to communicate therewith, a supply and blow-out chamber having communication with said strainer element and adapted to communicate with a blow-out connection, said supply chamber adapted to communicate with said supply and blow-out chamber, and valve mechanism for controlling communication between said supply chamber and said cleaning fluid passage and supply and blow-out chamber, respectively, and between said supply and blow-out chamber and said blow-out connection, said valve mechanism comprising a valve stem and three valves carried thereby and adapted to be manipulated from said valve stem, one of said valves adapted to interrupt communication between said supply chamber and supply and blow-out chamber while said supply chamber is communicating with said cleaning fluid passage and said supply and blow-out chamber is communicating with said blow-out connection, and two of said valves adapted to interrupt communication between said supply chamber and cleaning fluid passage and between said supply and blow-out chamber and said blow-out connection while said supply chamber and supply and blow-out chamber are communicating with each other.

Signed at Bridgeport, in the county of Fairfield and State of Connecticut, this 1st day of Sept., A. D., 1920.

GEORGE W. COLLIN.

Witnesses:
C. M. NEWMAN.
E. A. NEWMAN.